Nov. 11, 1924.

A. W. KRAHN 1,514,622

DRIP PAN FOR WRINGERS

Filed Oct. 14, 1921

INVENTOR.
Alvin W. Krahn
BY
Erwin Wheeler & Wooley
ATTORNEY.

Patented Nov. 11, 1924.

1,514,622

UNITED STATES PATENT OFFICE.

ALVIN W. KRAHN, OF MILWAUKEE, WISCONSIN.

DRIP PAN FOR WRINGERS.

Application filed October 14, 1921. Serial No. 507,733.

*To all whom it may concern:*

Be it known that I, ALVIN W. KRAHN, a citizen of the United States, residing at Milwaukee, county of Milwaukee, and State of Wisconsin, have invented new and useful Improvements in Drip Pans for Wringers, of which the following is a specification.

This invention relates to locking devices for wringer drip or drain pans.

The object of this invention is to provide a wringer with an adjustable drain pan adapted to be inclined in either direction; i. e., toward that side of the wringer which is being used as the clothes receiving side, and which, when adjusted to either of its inclined positions, will be automatically locked in such a position by a set of interchangeably operative, simply constructed lock dogs, one of which is held in inoperative position while the other is in locking position.

More specifically stated, the object of my invention is to provide one or both margins of the drip pans with a pair of inexpensive reliable lock members, each adapted to co-operate with the wringer frame, when the drip pan is in one position of adjustment, to hold the drip pan in such position, the locking devices requiring no attention from the operator except the simple operation of manually releasing the one which is in locked position, preparatory to a reversal of the inclination of the pan.

An embodiment of the invention is shown in the accompanying drawings, in which.

Figure 1:
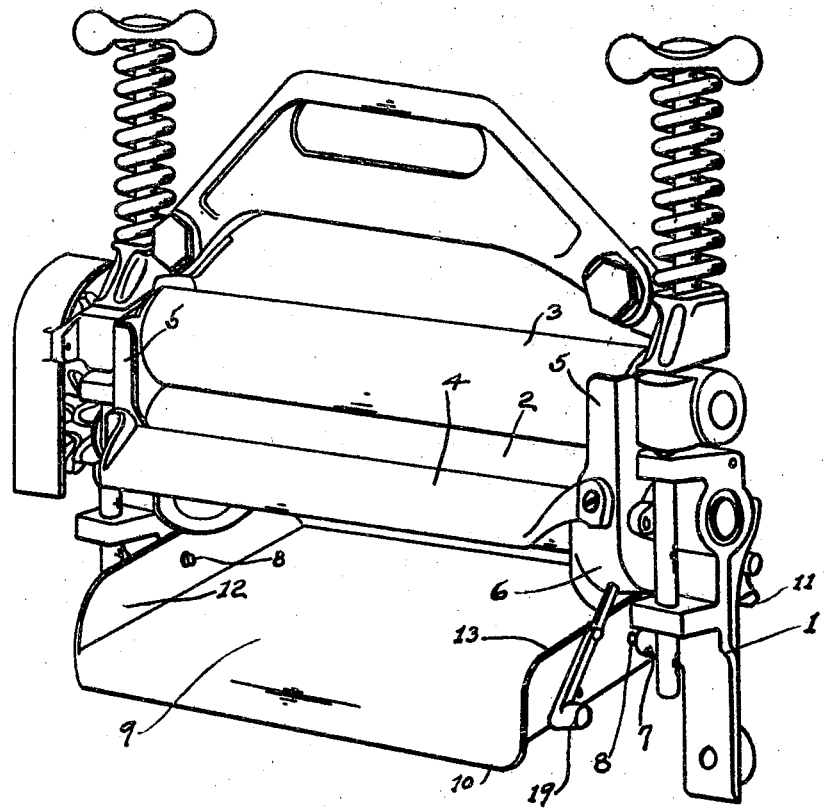
Figure 1 is a perspective view of a wringer equipped with a drip pan showing the drip pan in one position of adjustment.

The wringer comprises the usual standard 1 within which are journaled the rollers 2 and 3. A guiding lip 4 is positioned upon each side of the rollers and is supported by a framework 5 carried by the respective standards 1. Each standard 1 is provided with an inwardly projecting portion 6 having a rounded lower surface and adapted to co-operate with the locking dogs as hereinafter explained. The standards 1 are provided with inwardly directed bosses which are equipped with inwardly directed pins 8.

The drip pan comprises a channel-shaped member having a bottom portion 9 preferably provided with downwardly directed outer marginal flanges 10 and 11 and with upstanding end flanges 12 and 13. Each of the ends 12 and 13 has pivotally secured thereto by means of rivets 14 and 15 a pair of oppositely disposed locking dogs or levers 16 and 17. These levers are equipped with laterally extending weighted arms 18 and 19 on the outer ends of the levers which normally tend to rock the associated lever into locking position with its inner end raised to a position where it approximately abuts the rounded surface 6, with the pivoted lever or dog substantially perpendicular thereto.

The drip pan is made from sheet metal, preferably rust proof material, and is provided with holes 20 in each of the upstanding ends 12 and 13, such holes being approximately centrally located. In assembling the drip pan, the ends 12 and 13 may be sprung inwardly slightly and the projecting pins 8 may be passed thru the slots 20, thereby pivotally securing the drip pan in position upon the wringer standards, to be reversely tilted and adjusted to a position downwardly inclined toward the side from which the clothing is being received.

When it is desired to reverse the inclination of the drip pan, the locking lever that is in engagement with the rounded portion 6 of the frame piece 5, is first tilted by raising the weighted member 18 (or 19) upwardly. The drip pan is then tilted into the reverse position so that it extends downwardly upon the opposite side of the wringer. During this movement of the pan, the lifted lever 17 is held in its folded or neutral position by the rounded surface of the member 6. The opposing lever 16 then rocks about its pivot stud or rivet 14 under the influence of its weighted handle 19 (or 18) until it stands substantially perpendicular to the surface of the member 6 on that side, or slightly beyond the perpendicular line, thus locking the drip pan in such position. The weighted arm of each of the locking levers 16 or 17 is limited as to its downward movement by a stop 27.

The downwardly tilting movement of the drip pan is limited by engagement of the upper margins of its end flanges with the overhanging portions of the frame members 6, the levers being used merely to prevent the depressed side from being lifted by the drag of the clothes when they are being passed thru the wringer.

It is obvious that the levers or locking dogs are inexpensive in construction and simple in design. They require no attention in operation except to lift the engaged dog or lever preparatory to reversing the position of the pan. They are associated with the pan in a position where the clothing will not catch them, and inasmuch as each comprises a single piece, operative independently of the other, they may be relied upon to invariably perform their functions. While a pair of these dogs may be applied to each end of the pan, it will ordinarily be found satisfactory to apply them to one end only. While I have referred to the dogs as substantially perpendicular to the opposing surface of the member 6 when in locking position, it will be understood that if they engage or oppose such surface when approaching a perpendicular line close enough to prevent slipping, they will ordinarily hold the pan from accidentally reversing, but if they swing to or across such line, they will hold the pan with greater security.

Figure 2:
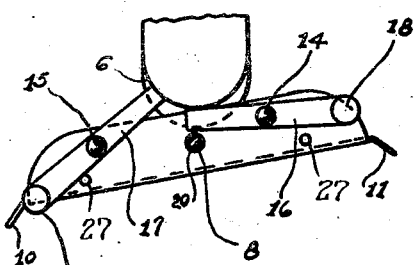
Figure 2 is a fragmentary detail end view of the drip pan associated with a portion of the framework of the wringer showing how the drip pan is locked in its adjusted position.
Figure 3:
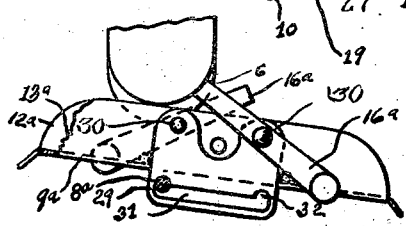
Figure 3 is a detail end view, showing a modification.

In Figure 3 I have illustrated my invention as applied to a drip pan of that type in which a sliding movement is permitted across the pivotal axis. The pan comprises a bottom portion $9^a$, provided with raised ends $12^a$ and $13^a$ to which bracket plates 29 are attached by rivets 30. Each of these brackets is provided with a slot 31, enlarged upwardly at each end as indicated at 32, whereby the pivot pins or studs $8^a$ (corresponding with the pins 8 in Figure 1) may be anchored at either end of the slot. The weighted levers or dogs $16^a$ are connected and operate in substantially the same manner as above described with reference to Figures 1 and 2, but the levers of the pair are preferably located at opposite ends, one at each end, and each is so located as to be in a position to engage the rounded surface of the frame projection 6 when the studs $8^a$ are in one of the enlargements or notches 32.

I claim:

1. A drip pan for a wringer, comprising a channel-shaped member, said member having upstanding edges provided with openings adapted to engage portions of the wringer, and a pair of locking levers each pivotally mounted upon one of said upstanding edges and each adapted, in one position of drip pan adjustment, to automatically engage a portion of said wringer and positively lock the drip pan in such position of adjustment.

2. An adjustable drip pan for a wringer, having upstanding end portions provided with elongated slots adapted to receive projecting portions of a wringer, a pair of weighted levers each pivotally joined to one of said upstanding end portions on opposite sides of its transverse center line and adapted respectively to engage a portion of the wringer frame to lock said drip pan in different positions of adjustment.

3. In combination, a wringer having inwardly projecting pivot studs, and a member having a rounded surface adjacent each end of the wringer a drip pan comprising a channel-shaped member having upstanding end portions provided with elongated slots adapted to co-operate with said pivot studs to pivotally support said drip pan and allow it to slide in limited bodily movement across the pivotal axis, and a pair of weighted levers, each pivotally joined to one of said upstanding end portions and adapted to co-operate with said rounded surface to positively lock said drip pan in either one of two positions of adjustment.

4. A drip pan for wringers provided with a pair of oppositely disposed, gravity actuated locking dogs.

5. A drip pan for wringers provided with a pair of oppositely disposed, gravity actuated locking dogs, in combination with a wringer frame provided with rounded surfaces to which the dogs are substantially perpendicular when in locking position.

6. The combination with a wringer frame, of a tiltable drip pan provided with a pair of oppositely disposed dogs, said frame being adapted to hold one of the dogs in a folded inoperative position at the raised side of the pan and to co-operate with the other dog to prevent the pan from tilting reversely.

7. The combination with a wringer frame, of a tiltable drip pan provided with a pair of oppositely disposed dogs, said frame being adapted to hold one of the dogs in a folded inoperative position at the raised side of the pan and to co-operate with the other dog to prevent the pan from tilting reversely, said pan being also provided with means for engaging the frame to limit its tilting movement in either direction.

8. The combination with a wringer frame, of a tiltable drip pan provided with a pair of oppositely disposed dogs, said frame being adapted to hold one of the dogs in a folded inoperative position at the raised end of the pan and to co-operate with the other dog to prevent the pan from tilting reversely and said pan and frame being arranged to allow a bodily movement of the pan across its tilting axis sufficient to release the folded dog when the other is folded and the pan reversely tilted.

9. The combination with a supporting frame, of a pan oscillatory with respect thereto and projecting therefrom, means for limiting the oscillatory movement of said pan in one direction, and a dog in pivotal engagement with said pan and of a length to contact with a portion of said frame when said pan is substantially at the limit of its movement in said direction, said dog being pivotally movable between a position free of said frame and a position for contact therewith.

10. The combination with a supporting frame, of a pan oscillatory with respect thereto and projecting therefrom, means for limiting the oscillatory movement of said pan in one direction, and a dog in pivotal engagement with said pan and of a length to contact with a portion of said frame when said pan is substantially at the limit of its movement in said direction, said dog being pivotally movable between a position free of said frame and a position for contact therewith and being unbalanced in said first mentioned position, whereby to tend automatically to be gravity actuated toward said last mentioned position.

11. The combination with a supporting frame having downwardly rounded surfaces, of a pan oscillatory with respect to said frame between positions sloping downwardly to either side thereof, and dogs pivotally connected with said pan and adapted to engage opposite sides of said surfaces.

12. The combination with a supporting frame having downwardly rounded surfaces, of a pan oscillatory with respect to said frame between positions sloping downwardly to either side thereof, and dogs pivotally connected with said pan and adapted to engage opposite sides of said surfaces, said dogs being of a length to extend from a downward side of said pan to substantially radial contact with an adjacent surface.

13. The combination with a supporting frame having downwardly rounded surfaces, of a pan oscillatory with respect to said frame between positions sloping downwardly to either side thereof, and dogs pivotally connected with said pan and adapted to engage opposite sides of said surfaces, said dogs being of a length to extend from a downward side of said pan to substantially radial contact with an adjacent surface and being automatically operable to a position for engagement therewith.

14. The combination with a wringer frame providing downwardly converging stop surfaces on its opposite sides, of a pan oscillatory with respect to said frame and having margins adapted to project laterally therefrom and to be raised or lowered in the oscillation of said pan, and levers pivotally connected with said pan on opposite sides thereof and of a length to abut said surfaces substantially perpendicularly when the adjacent margin of the pan is lowered.

15. The combination with a wringer frame providing downwardly converging stop surfaces on its opposite sides, of a pan oscillatory with respect to said frame and having margins adapted to project laterally therefrom and to be raised or lowered in the oscillation of said pan, and levers pivotally connected with said pan on opposite sides thereof and of a length to abut said surfaces substantially perpendicularly when the adjacent margin of the pan is lowered, said levers being so counterweighted as to tend to swing about their respective pivots toward positions for abutment with said surfaces as aforesaid.

16. The combination with a wringer frame member and a relatively oscillatory pan member, of levers pivotally connected with one of said members and oscillatory to and from positions for engagement with the other member, said levers being yieldably pressed toward said positions and said other member being provided with surfaces to which said levers are substantially perpendicular in said positions.

17. The combination with a wringer frame member and a relatively oscillatory pan member, of levers pivotally connected with one of said members and oscillatory to and from positions for engagement with the other member, each of said levers being provided with a counterweight urging it toward said position and being of a length to conform substantially to the shortest line between its fulcrum, and said other member at one point during the oscillation of said pan member and too long for end engagement as aforesaid at other points of said oscillation.

ALVIN W. KRAHN.